US009062625B2

(12) United States Patent
Lee et al.

(10) Patent No.: US 9,062,625 B2
(45) Date of Patent: Jun. 23, 2015

(54) FUEL CONTROL SYSTEM AND FUEL CONTROL METHOD OF A GASOLINE DIRECT INJECTION ENGINE

(71) Applicants: Hyundai Motor Company, Seoul (KR); Kia Motors Corporation, Seoul (KR)

(72) Inventors: Heungseok Lee, Seoul (KR); Wan Soo Oh, Yongin-si (KR); Yong Wook Jin, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 238 days.

(21) Appl. No.: 13/731,467

(22) Filed: Dec. 31, 2012

(65) Prior Publication Data

US 2014/0100759 A1 Apr. 10, 2014

(30) Foreign Application Priority Data

Oct. 5, 2012 (KR) ........................ 10-2012-0110942

(51) Int. Cl.

| | |
|---|---|
| ***G06F 19/00*** | (2011.01) |
| ***F02M 57/02*** | (2006.01) |
| ***F02D 41/30*** | (2006.01) |
| ***F02D 41/04*** | (2006.01) |
| ***F02D 41/38*** | (2006.01) |
| *F02D 9/02* | (2006.01) |

(52) U.S. Cl.

CPC .... *F02D 41/3082* (2013.01); *F02D 2009/0245* (2013.01); *F02D 41/042* (2013.01); *F02D 41/3845* (2013.01); *F02D 2200/101* (2013.01)

(58) Field of Classification Search

CPC .............. F02D 41/042; F02D 41/3845; F02D 41/3082; F02D 2009/0245; F02D 2200/101

USPC .................. 701/112, 103; 123/512, 511, 510, 123/339.29, 446, 495, 508, 457, 458, 467, 123/499; 417/523, 540

See application file for complete search history.

(56) References Cited

U.S. PATENT DOCUMENTS

| | | | | |
|---|---|---|---|---|
| 4,884,545 | A * | 12/1989 | Mathis | 123/447 |
| 5,797,374 | A * | 8/1998 | Minagawa et al. | 123/497 |
| 6,659,085 | B2 * | 12/2003 | Kojima | 123/456 |
| 6,668,805 | B2 * | 12/2003 | Kato et al. | 123/491 |
| 8,418,677 | B2 * | 4/2013 | Okamoto | 123/512 |
| 8,812,215 | B2 * | 8/2014 | Sugiyama et al. | 701/104 |
| 2007/0028897 | A1 * | 2/2007 | Fukasawa | 123/467 |
| 2008/0257312 | A1 * | 10/2008 | Hasegawa et al. | 123/491 |
| 2008/0262700 | A1 * | 10/2008 | Okamoto | 701/103 |
| 2009/0118991 | A1 * | 5/2009 | Ueda | 701/112 |
| 2011/0196594 | A1 * | 8/2011 | Hasegawa | 701/103 |
| 2014/0121943 | A1 * | 5/2014 | Lee et al. | 701/103 |
| 2014/0163847 | A1 * | 6/2014 | Lane et al. | 701/113 |

FOREIGN PATENT DOCUMENTS

| | | | |
|---|---|---|---|
| JP | 2001-27164 | A | 1/2001 |
| KR | 10-2012-0045279 | A | 5/2012 |

* cited by examiner

*Primary Examiner* — Stephen K Cronin
*Assistant Examiner* — George Jin
(74) *Attorney, Agent, or Firm* — Morgan, Lewis & Bockius LLP

(57) ABSTRACT

A fuel control system and fuel control method of gasoline direct injection engine can improve noise vibration harshness (NVH) by preventing fuel from flowing backward into a low pressure pump by determining whether the ignition of the engine is turned off and maintaining the operation of an inlet valve of a high pressure pump for a predetermined time when the ignition of the engine is determined to be turned off.

6 Claims, 8 Drawing Sheets improving high pressure pump operating noise(key-off)

FUEL CONTROL SYSTEM AND FUEL CONTROL METHOD OF A GASOLINE DIRECT INJECTION ENGINE

CROSS-REFERENCE TO RELATED APPLICATION

The present application claims priority of Korean Patent Application Number 10-2012-0110942 filed Oct. 5, 2012, the entire contents of which application is incorporated herein for all purposes by this reference.

BACKGROUND OF INVENTION

1. Field of Invention

The present invention relates to a system and method for controlling fuel of gasoline direct injection (GDI) engine.

2. Description of Related Art

In general, a low pressure pump operated by a motor is mounted inside a fuel tank, and a high pressure pump operated by a cam shaft is mounted at a head cover in a fuel system of a gasoline direct injection (GDI) engine.

Further, the fuel system may include an injector for injecting fuel into each combustion chamber, and a pressure sensor for detecting an internal pressure of a fuel rail that is a fuel pressure of each injector.

A fuel of the fuel tank is supplied to the engine by the low pressure pump, and the fuel supplied to the engine is supplied to the fuel rail by the high pressure pump pressurized by about 120 bar.

The pressure sensor which is mounted at the end of the fuel rail detects pressure of the fuel rail and sends the pressure information to a controlling means. The controlling means controls fuel pressure by feedback from the pressure sensor for maintaining optimum pressure of each condition.

A high pressure pump applied to general GDI engine may include a plunger, a control valve, and a solenoid.

In the high pressure pump, the plunger reciprocates up and down with the camshaft and pressurizes a fuel. Further, a compression pressure of fuel is controlled by a closing time of the control valve that is an inlet valve of the high pressure pump when the plunger is in between top dead center and bottom dead center. An outlet valve of the high pressure pump opens when the compression pressure of fuel is reached to a certain pressure, and the fuel moves to the injector.

The controlling means controls discharge rate and discharge pressure of fuel by controlling closing time of the control valve that is an inlet valve of the high pressure pump, since fuel can be discharged when the control valve is fully closed.

The high pressure pump comes to stop within 0.1 seconds when the ignition of the engine is turned off.

The control valve becomes fully open when the high pressure pump stops, therefore a fuel compressed inside the high pressure pump flows backward to the low pressure pump when the high pressure pump stops.

Vibration and noise are created by the pulsation of the fuel flowing backward to the low pressure pump therefore there is a problem that the noise vibration harshness (NVH) is worsening.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a fuel control system and a fuel control method of a gasoline direct injection engine having advantages of reducing noise, vibration and harshness by preventing fuel from flowing backward to low pressure pump when the ignition of the engine is turned off.

Various aspects of the present invention provide for a fuel control method of a gasoline direct injection engine which injects a fuel pressurized by a high pressure pump into a combustion chamber of the engine directly may include: determining whether the ignition of the engine is turned off, and maintaining operation of an inlet valve of the high pressure pump which operates electronically so as to selectively supply fuel into the high pressure pump for a predetermined time when the ignition of the engine is turned off.

The predetermined time may be the time that is takes the rotation speed of engine to become 0.

The maintaining operation of the inlet valve for the predetermined time may include: maintaining the operation of the inlet valve when the ignition of the engine is turned off; determining whether the rotation speed of the engine becomes 0; and stopping the operation of the inlet valve when the rotation speed of the engine becomes 0.

The operating speed of the inlet valve for the predetermined time may be reduced to less than the speed of before the ignition of the engine is turned off.

The maintaining operation of the inlet valve for the predetermined time may further include: determining whether some conditions such as the rotation speed of the engine is slower than a predetermined value, a pressure of a fuel rail which accommodates high-pressure fuel sent from the high pressure pump and distributes the high-pressure fuel over each injector of the combustion chamber is less than a predetermined pressure, and an amount of fuel injection is smaller than a predetermined amount are satisfied; and reducing the operating speed of the inlet valve for the predetermined time to less than the operating speed of before the ignition of the engine is turned off if the conditions are satisfied.

The high pressure pump may further include a plunger which pressurizes fuel by reciprocating up and down with the camshaft, and wherein the closing speed of the inlet valve may be reduced to less than the speed of before the ignition of the engine is turned off when the plunger moves from bottom dead center to top dead center.

The high pressure pump may further include a plunger which pressurizes fuel by reciprocating up and down with the camshaft, and wherein the opening speed of the inlet valve may be reduced to less than the speed of before the ignition of the engine is turned off when the plunger moves from top dead center to bottom dead center.

Various aspects of the present invention provide for a fuel control system of a gasoline direct injection engine that may include: the gasoline direct injection engine which injects fuel into a combustion chamber directly; a low pressure pump which is mounted inside a fuel tank and pumps fuel by the operation of a motor; a high pressure pump which provides fuel to a fuel rail by receiving fuel from the low pressure pump and boosting the pressure of fuel; a pressure sensor detecting pressure inside the fuel rail; and a control unit receiving information from the pressure sensor or the engine and controls the engine, the high pressure pump or the low pressure pump; wherein the control unit controls the engine, the high pressure pump or the low pressure pump according to one of the fuel control methods.

The high pressure pump may include an inlet valve which selectively opens and closes an entrance, where a fuel sent from the low pressure pump is flowing into; a plunger which pressurizes fuel by reciprocating up and down with the camshaft; and an exhaust valve which opens and closes an exit, where a fuel discharge into the fuel rail.

The fuel control system and fuel control method of a gasoline direct injection engine may have advantages of reducing noise, vibration and harshness by preventing fuel from flowing backward to low pressure pump when the ignition of the engine is turned off by maintaining the operation of the inlet valve of the high pressure pump for a predetermined time.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
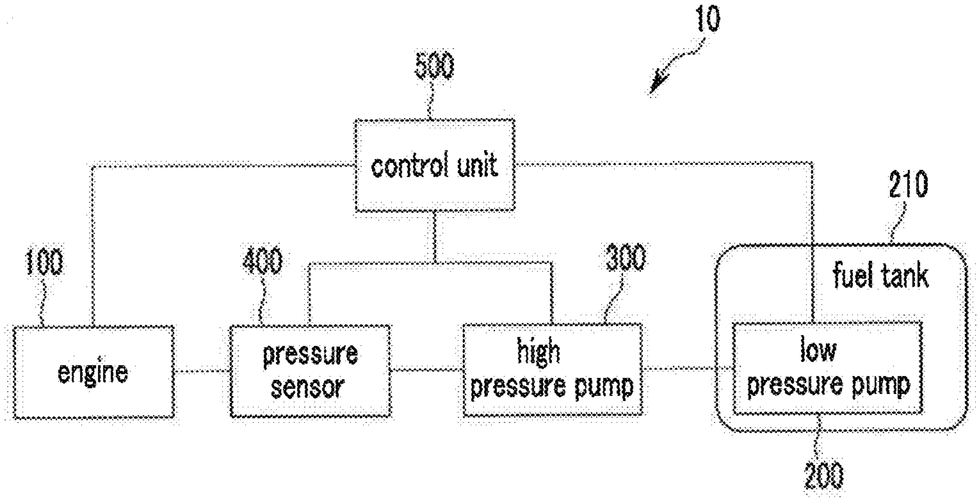
FIG. 1 is a block diagram of an exemplary fuel control system of a gasoline direct injection engine according to the present invention.
Figure 2:
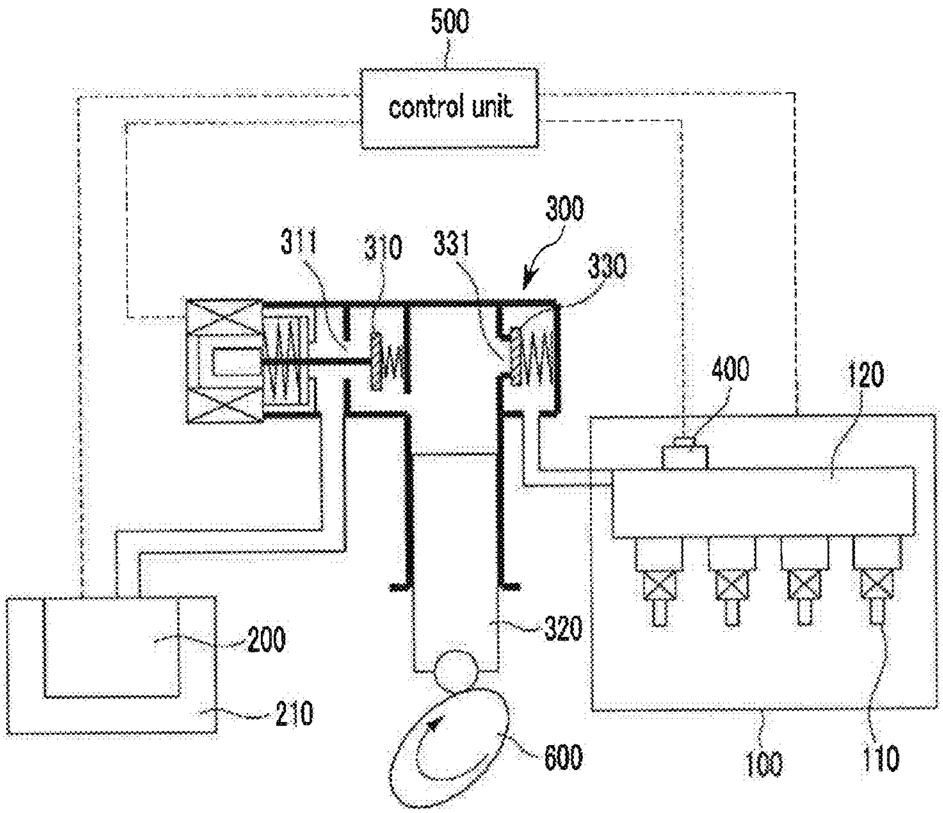
FIG. 2 is a schematic diagram of an exemplary fuel control system of a gasoline direct injection engine according to the present invention.

FIG. 1 is block diagram of a fuel control system 10 of a gasoline direct injection engine according to various embodiments of the present invention and, FIG. 2 is a schematic diagram of a fuel control system 10 of a gasoline direct injection engine according to various embodiments of the present invention.

As shown in FIG. 1 or FIG. 2, the fuel control system of the gasoline direct injection engine of various embodiments of the present invention may include an engine 100, a low pressure pump 200, a high pressure pump 300, pressure sensor 400 and control unit 500.

The gasoline direct injection (GDI) engine 100 is an engine that injects a fuel to a combustion chamber directly. The gasoline direct injection engine 100 boosts pressure of a fuel which was sent from the low pressure pump 200 mounted at a fuel tank 210 in the high pressure pump 300 and supplies the fuel into an injector 110.

The low pressure pump 200 is generally mounted inside of the fuel tank 210. The low pressure pump 200 sends a fuel to the injector 110 by pumping the fuel stored in the fuel tank 210 by driving a motor.

According to various embodiments, the low pressure pump 200 may be a BLDC pump that is driven by a brushless direct current (BLDC) motor. The BLDC motor has an advantage of reducing current consumption of the low pressure pump 200 since the BLDC motor can increase efficiency of the low pressure pump 200 due to its operating characteristics.

The high pressure pump 300 provides fuel to a fuel rail 120 which is connected to the injector 110 of the engine 100 by receiving fuel from the low pressure pump 200 and boosting the pressure of fuel.

The fuel rail 120 receives high-pressure fuel sent from the high pressure pump 300 and distributes the high-pressure fuel over injector 110 of each combustion chamber.

In various embodiments, the high pressure pump 300 may include an inlet valve 310, a plunger 320, and an exhaust valve 330 as shown in FIG. 2.

The inlet valve 310 is connected to the control unit 500 and opens and closes an entrance 311, where a fuel sent front the low pressure pump 200 is flowing into.

The inlet valve 310 may be a solenoid valve which is connecting to the control unit 500 and is electronically controlled by the control unit 500 so as to selectively provide fuel into the high pressure pump 300.

The plunger (Plunger) 320 boosts a pressure of fuel by pressurizing fuel by reciprocating up and down with the camshaft 600.

The exhaust valve (outlet valve) 330 opens and closes the exit 331, where a fuel discharge into the fuel rail 120. The exhaust valve 330 may be a mechanical valve that opens automatically when the internal pressure of the high pressure pump 300 becomes larger or equal than a predetermined pressure.

The pressure sensor 400 detects an internal pressure of the fuel rail 12 and may be mounted at the fuel rail 120 by inserting it through the fuel rail 120.

The control unit 500 controls the fuel control system 10 of the gasoline direct injection engine over all. The control unit 500 may be an electronic control unit (ECU) of the vehicle and control the engine 100, the low pressure pump 200 and the high pressure pump 300.

If a fuel stored in the fuel tank 210 is exhausted by the low pressure pump 200, then the fuel is highly pressurized by the high pressure pump 300 and is sent into the fuel rail 120. And the fuel inside in the fuel rail 120 is injected into each combustion chamber through each injector 110. The control unit 500 controls the system 10 so as to maintain an internal pressure of the fuel rail 120 within predetermined range by receiving the information of internal pressure of the fuel rail 120 from the pressure sensor 400.

In the case of the fuel control system 10 according to various embodiments of the present invention, the control unit 500 controls the high pressure pump 300 by receiving information about whether the ignition of the engine 100 is turned on or is turned of from the engine 10.

The control unit 500 may include at least one processor which is operated by predetermined program. And the predetermined program may be programmed to carry out each step of the fuel control method of the gasoline direct injection engine according to various embodiments of the present invention.

The fuel control method of the gasoline direct injection engine according to various embodiments of the present invention will hereinafter be described in detail with reference to the accompanying drawings.

Figure 3:
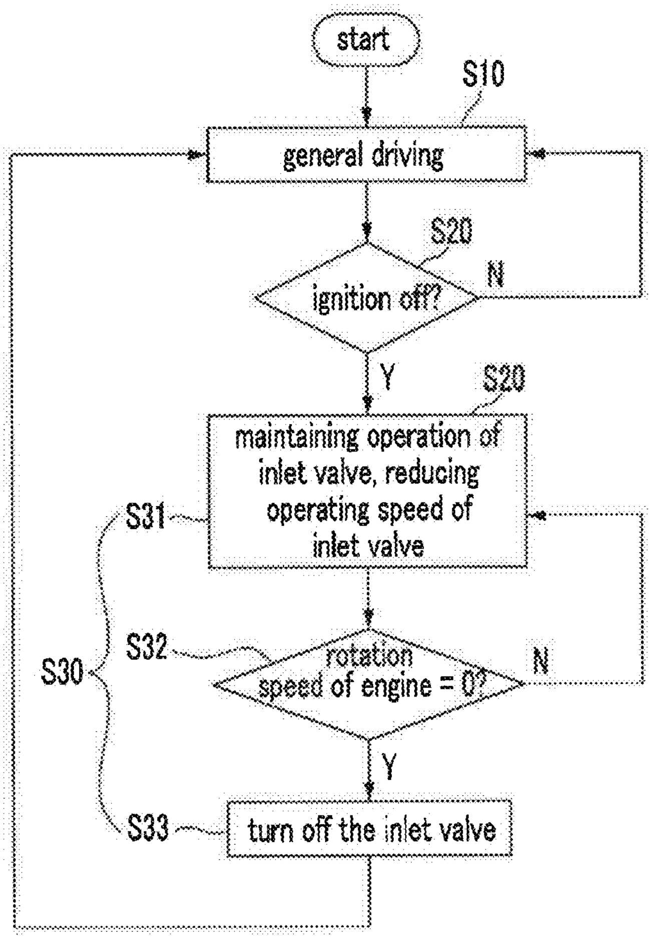
FIG. 3 is a flowchart of an exemplary fuel control method of a gasoline direct injection engine according to the present invention.

FIG. 3 is flowchart of the fuel control method of the gasoline direct injection engine according to various embodiments of the present invention.

In step S10, the ignition of the vehicle engine is in a turned-on state by the operations of the high pressure pump 300 and the gasoline direct injection engine.

The control unit 500 determines whether the ignition of the engine 100 is turned off in the step S10 state. The control unit 500 can determine whether the ignition of the engine is turned off by receiving information from the engine 100.

In various embodiments, the ignition of the engine 100 may be turned off by a vehicle user or by fuel cut off. Further the ignition of the engine 100 may be turned off by abnormal stop of the engine caused by errors of the vehicle.

In step S30, the control unit 500 maintains the operation of the inlet valve 310 of the high pressure pump 300 for a predetermined time. In the case of prior art, there is a problem that fuel is flowing backward to a low pressure pump side, since an inlet valve of a high pressure pump is stopped being fully opened when the ignition of the engine is turned off. However, the present invention can keep the fuel from flowing backward by maintaining the operation of the inlet valve 310 of the high pressure pump 300 for the predetermined time although the ignition of the engine is turned off, such that noise and vibration can be reduced according to the present invention.

In various embodiments, the predetermined time may be a time that is taken for the rotation speed of engine 100 to become 0 after the ignition of the engine 100 is turned off. The operation of the inlet valve 310 is maintained until the rotation speed of the engine 100 becomes 0.

As shown in FIG. 3, the control unit 500 maintains the operation of the inlet valve 310 when the ignition of the engine 100 is turned off at step S31, determines whether the rotation speed of the engine 100 becomes 0 at step S32, and turns off the operation of the inlet valve 310 if the rotation speed of the engine 100 becomes 0 at step S33 or maintains the operation of the inlet valve 310 by going back to the step S31 if the rotation speed of the engine 100 is not 0.

The operation of the inlet valve 310 is maintained until the rotation speed of the engine 100 becomes 0 in the step S31. Further, In step S31, the control unit 500 may reduce the rotation speed of the inlet valve 310 so as to make the rotation speed of the inlet valve 310 while maintaining the operation of the inlet valve 310 smaller than the rotation speed of the inlet valve 310 before the ignition of the engine 100 is turned off. Noise and vibration can be reduced by reducing the operation speed of the inlet valve 310 during the predetermined time such that the inlet valve 310 is operating so as to make the opening and closing of the inlet valve slower.

In various embodiments, the control unit 500 can make the closing speed of the inlet valve 310 when the plunger 320 of the high pressure pump 300 moves from bottom dead center (BDC) to top dead center (TDC) slower than the closing speed of the inlet valve 310 before the ignition of the engine 100 is turned off.

Figure 5:
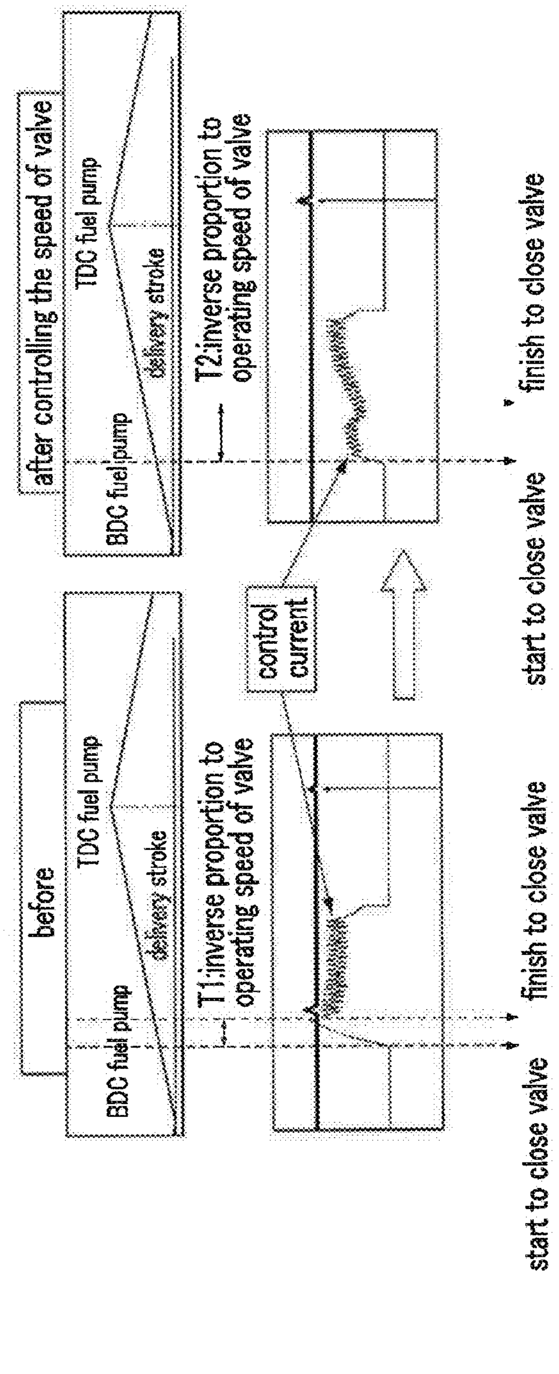
FIG. 5 is a diagram that compares before and after reducing closing speed of an exemplary inlet valve according to the present invention.

FIG. 5 is a diagram that compares before and after reducing closing speed of an inlet valve 310. According to various embodiments of the present invention, the time T2 that it takes to completely close the inlet valve 310 is extended more than the prior time T1 by changing current when the plunger 320 moves from bottom dead center (BDC) to top dead center (TDC). The plunger 320 pressurizes the fuel when it moves from bottom dead center (BDC) to top dead center (TDC). As a result a part of the fuel flows backward to the low pressure pump 200. According to various embodiments of the present invention, the flux of flowing backward to the low pressure pump 200 increases since the time that it takes to completely close the inlet valve 310 is extended. Therefore, the amount of fuel inside the high pressure pump 300 decreases, and the time it takes the plunger 320 to pressure the fuel inside the high pressure pump 300 can be shortened. As a result, the noise caused by pressurizing fuel can be reduced.

Further, in various embodiments, the control unit 500 can make the opening speed of the inlet valve 310 when the plunger 320 of the high pressure pump 300 moves from top dead center (TDC) to bottom dead center (BDC) slower than the opening speed of the inlet valve 310 before the ignition of the engine 100 is turned off.

Figure 6:
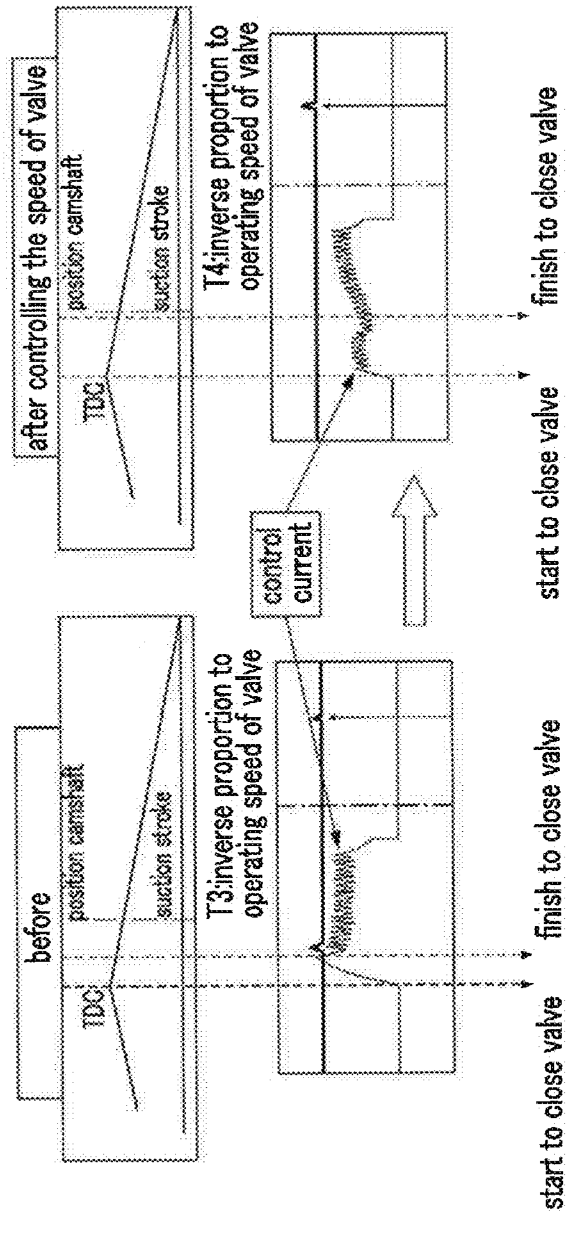
FIG. 6 is a diagram that compares before and after reducing opening speed of an exemplary inlet valve according to the present invention.

FIG. 6 is a diagram that compares before and after reducing opening speed of an inlet valve 310. According to various embodiments of the present invention, the time T4 that it takes to completely open the inlet valve 310 is extended more than the prior time T3 by changing current when the plunger 320 moves from top dead center (TDC) to bottom dead center (BDC). The pressure inside the high pressure pump 300 becomes the maximum when the plunger 320 is located at the top dead center (TDC). According to the present invention, the pressure inside the high pressure pump 300 decreases since the inlet valve 310 slowly opens while the plunger 320 moves from top dead center (TDC) to bottom dead center (BDC). The inlet valve is completely opened in the state that the pressure inside the high pressure pump 300 is significantly decreased. As a result, the flux and the flow speed of fuel that flows backward to the low pressure pump 200 is decreased. Therefore vibration and noise can be reduced.

Figure 4:
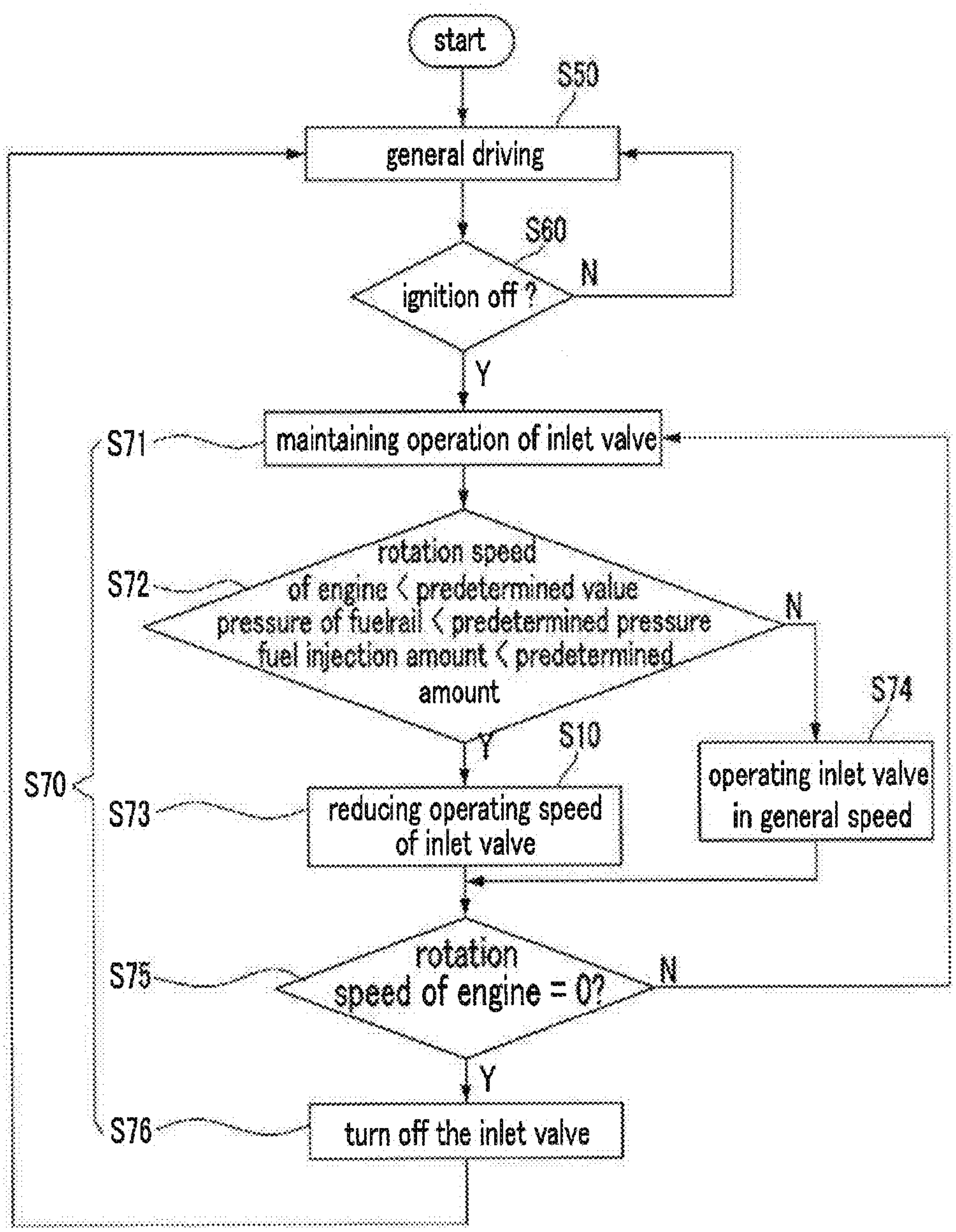
FIG. 4 is a flowchart of an exemplary fuel control method of a gasoline direct injection engine according to the present invention.

FIG. 4 is a flowchart of a fuel control method of a gasoline direct injection engine according to various embodiments of the present invention.

In the case of the fuel control method according to various embodiments of the present invention, like the above embodiments of the present invention, the ignition of the engine has been turned on at step S50, and then the control unit 500 determines whether the ignition of the engine is turned off at step S60. In step S70, the control unit 500 maintains the operation of the inlet valve 310 of the high pressure pump 300 for a predetermined time.

However, there is a difference in details between the step S70 of various embodiments and the step S30 of the above embodiments.

According to various embodiments of the present invention, as shown in FIG. 4, the control unit 500 maintains the operation of the inlet valve 310 for a predetermined time although the ignition of the engine is turned off at step S71.

And then, the control unit 500 determines whether some conditions such as the rotation speed of the engine is slower than a predetermined value, a pressure of the fuel rail is less than a predetermined pressure, and an amount of fuel injection is smaller than a predetermined amount are satisfied at step S72.

And the control unit 500 makes the operating speed of the inlet valve 310 slower than the speed before the ignition of the engine is turned off at step S73 if the conditions are satisfied.

And the control unit 500 maintains the operating speed of the inlet valve 310 equal to the speed before the ignition of the engine is turned off at step S74 if the conditions are not satisfied.

In various embodiments of the present invention, unlike the above embodiments, the operating speed of the inlet valve 310 is reduced to less than the operating speed of before the ignition of the engine is turned off at the step S73 only if all the conditions of the step S72 are satisfied. In various embodiments of the present invention, like the above embodiments, the flux of fuel that flows backward to the low pressure pump 200 can be decreased by maintaining the operation of the inlet valve 310 for the predetermined time at the step S71 although the ignition of the engine is turned off. Therefore vibration and noise can be reduced.

However, according to various embodiments of the present invention, unlike the above embodiments, the operation speed of the inlet valve 310 can be reduced at the step S73 only if the conditions of the step S72 such that inside of the vehicle is quiet like idle state are satisfied.

The step S73 may be performed by reducing the closing speed of the inlet valve 310 when the plunger 320 moves from bottom dead center (BDC) to top dead center (TDC), and reducing the opening speed of the inlet valve 310 when the plunger 320 moves from top dead center (TDC) to bottom dead center (BDC). Detailed explanation about this will be leaved out since this is described in the above embodiments of the present invention.

The control unit 500 determines whether the rotation speed of the engine becomes 0 at step S75. The control unit 500 turns off the operation of the inlet valve 310 at step S76 if the rotation speed of the engine 100 becomes 0 or maintains the operation of the inlet valve 310 by going back to the step S71 if the rotation speed of the engine 100 is not 0.

Figure 7:
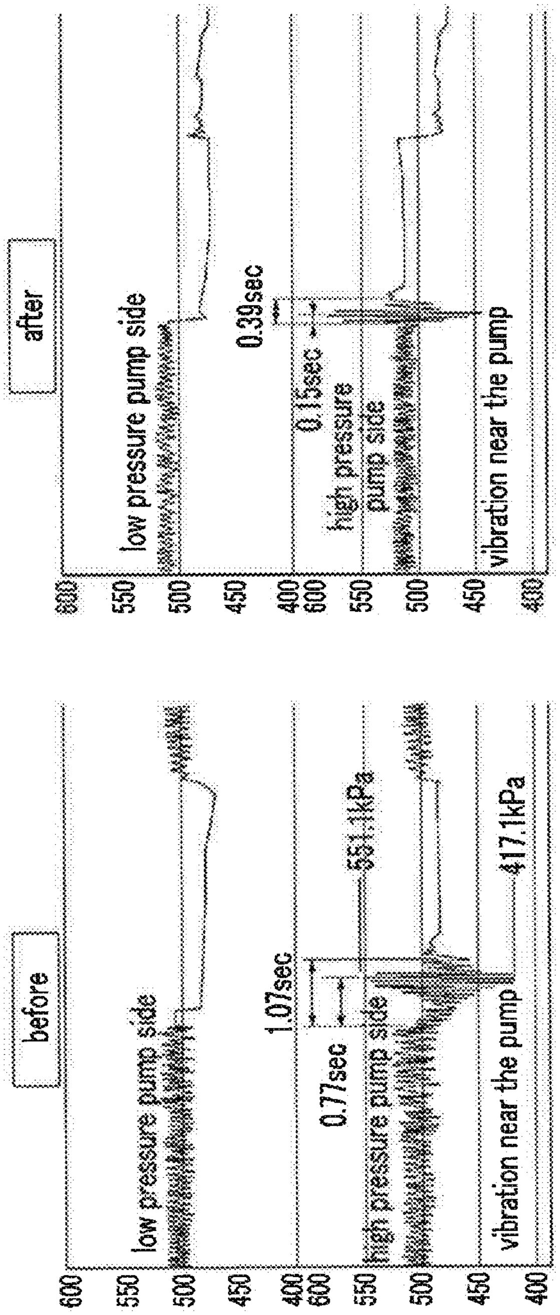
FIG. 7 is an experiment graph showing comparison of vibration of high pressure pump.
Figure 8:
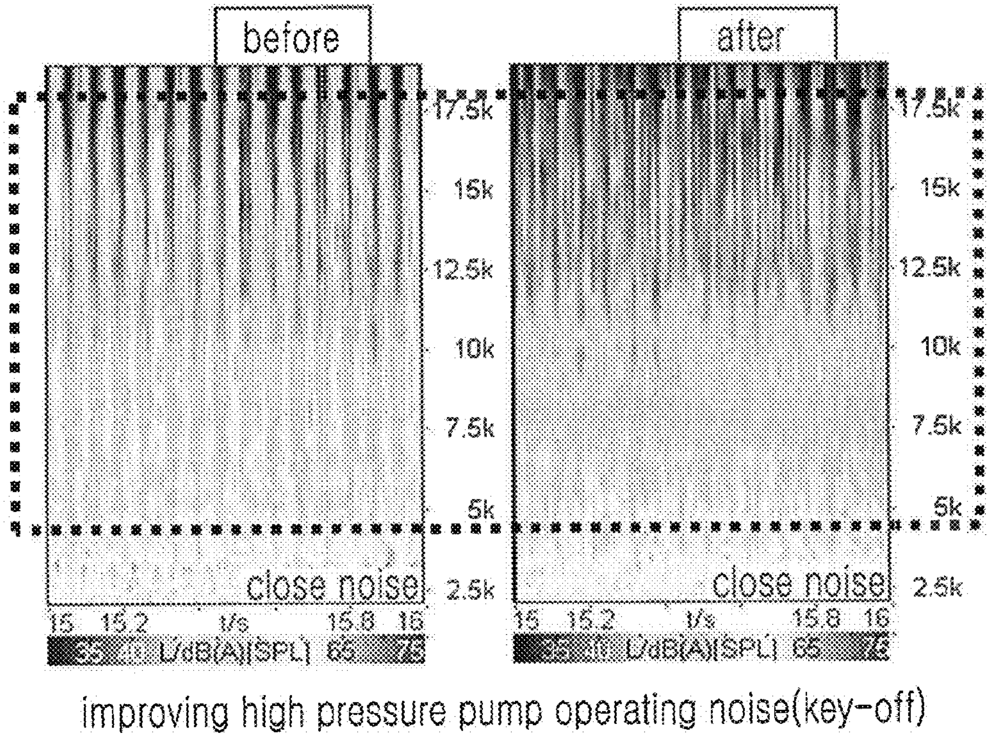
FIG. 8 is an experiment, graph showing comparison of noise of high pressure pump.

FIG. 7 is an experiment graph showing comparison of vibration of high pressure pump 300. FIG. 8 is an experiment graph showing comparison of noise of high pressure pump 300.

As shown in FIG. 7, in various embodiments of the present invention, the vibration produced in the high pressure pump 300 is much less than before. As shown in FIG. 8, in various embodiments of the present invention, the noise produced in the high pressure pump 300 is much less than before.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel control method of a gasoline direct injection engine which injects a fuel pressurized by a high pressure pump into a combustion chamber of the engine directly, comprising:

determining whether the ignition of the engine is turned off; and maintaining operation of an inlet valve of the high pressure pump which operates electronically so as to selectively supply fuel into the high pressure pump for a predetermined time when the ignition of the engine is turned off, wherein the predetermined time is a time period taken for the rotation speed of the engine to become 0 after the ignition of the engine is turned off, and wherein the maintaining operation of the inlet valve for the predetermined time comprises:

maintaining the operation of the inlet valve when the ignition of the engine is turned off;

determining whether the rotation speed of the engine becomes 0; and stopping the operation of the inlet valve when the rotation speed of the engine becomes 0.

2. The method of claim 1, the maintaining operation of the inlet valve for the predetermined time further comprising, determining whether some conditions such as the rotation speed of the engine is slower than a predetermined value, a pressure of a fuel rail which accommodates high-pressure fuel sent from the high pressure pump and distributes the high-pressure fuel over each injector of the combustion chamber is less than a predetermined pressure, and an amount of fuel injection is smaller than a predetermined amount are satisfied; and reducing the operating speed of the inlet valve for the predetermined time to less than the operating speed of before the ignition of the engine is turned off if the conditions are satisfied.

3. A fuel control method of a gasoline direct injection engine which injects a fuel pressurized by a high pressure pump into a combustion chamber of the engine directly, comprising:

determining whether the ignition of the engine is turned off; and maintaining operation of an inlet valve of the high pressure pump which operates electronically so as to selectively supply fuel into the high pressure pump for a predetermined time when the ignition of the engine is turned off, wherein the predetermined time is a time period taken for the rotation speed of the engine to become 0 after the ignition of the engine is turned off, wherein the operating speed of the inlet valve for the predetermined time is reduced to less than the speed of before the ignition of the engine is turned off, wherein the high pressure pump further comprises a plunger which pressurizes fuel by reciprocating up and down with the camshaft, and wherein the closing speed of the inlet valve is reduced to less than the speed of before the ignition of the engine is turned off when the plunger moves from bottom dead center to top dead center.

4. A fuel control method of a gasoline direct injection engine which injects a fuel pressurized by a high pressure pump into a combustion chamber of the engine directly, comprising:

determining whether the ignition of the engine is turned off; and maintaining operation of an inlet valve of the high pressure pump which operates electronically so as to selectively supply fuel into the high pressure pump for a predetermined time when the ignition of the engine is turned off, wherein the predetermined time is a time period taken for the rotation speed of the engine to become 0 after the ignition of the engine is turned off, wherein the operating speed of the inlet valve for the predetermined time is reduced to less than the speed of before the ignition of the engine is turned off, wherein the high pressure pump further comprises a plunger which pressurizes fuel by reciprocating up and down with the camshaft, and wherein the opening speed of the inlet valve is reduced to less than the speed of before the ignition of the engine is turned off when the plunger moves from top dead center to bottom dead center.

5. A fuel control system of a gasoline direct injection engine, comprising:

the gasoline direct injection engine which injects fuel into a combustion chamber directly;

a low pressure pump which is mounted inside a fuel tank and pumps fuel by the operation of a motor;

a high pressure pump which receives fuel from the low pressure pump and provides fuel to a fuel rail;

a pressure sensor detecting pressure inside the fuel rail; and a control unit receiving information from the pressure sensor or the engine and controls the engine, the high pressure pump or the low pressure pump;

wherein the control unit controls the engine, the high pressure pump or the low pressure pump according to the fuel control method of claim 3.

6. A fuel control system of a gasoline direct injection engine, comprising:

the gasoline direct injection engine which injects fuel into a combustion chamber directly;

a low pressure pump which is mounted inside a fuel tank and pumps fuel by the operation of a motor;

a high pressure pump which receives fuel from the low pressure pump and provides fuel to a fuel rail;

a pressure sensor detecting pressure inside the fuel rail; and a control unit receiving information from the pressure sensor or the engine and controls the engine, the high pressure pump or the low pressure pump;

wherein the control unit controls the engine, the high pressure pump or the low pressure pump according to the fuel control method of claim 4.

* * * * *